United States Patent [19]

Wei-Min

[11] Patent Number: 5,251,595
[45] Date of Patent: Oct. 12, 1993

[54] ROTOR ENGINE

[75] Inventor: Shen Wei-Min, Hunan, China

[73] Assignee: Shenzhen Aote Electrical Appliances Co. Ltd., Shenzhen, China; a part interest

[21] Appl. No.: 801,735

[22] Filed: Dec. 3, 1991

[30] Foreign Application Priority Data

Dec. 6, 1990 [CN] China ............................ 90 1 06132.8

[51] Int. Cl.⁵ ............................................. F02B 53/08
[52] U.S. Cl. .................................. 123/237; 123/223; 418/248
[58] Field of Search ............... 123/223, 236, 237, 248; 418/143, 249, 248

[56] References Cited

U.S. PATENT DOCUMENTS

| 1,228,072 | 5/1917 | Siner | 123/223 |
| 2,674,234 | 4/1954 | Riggle | 418/143 X |
| 4,009,690 | 3/1977 | Moran | 418/249 X |

FOREIGN PATENT DOCUMENTS

| 541693 | 5/1922 | France | 123/236 |
| 1153412 | 10/1957 | France | 123/237 |
| 1335918 | 7/1963 | France | 123/237 |
| 1531541 | 11/1978 | United Kingdom | 123/237 |

Primary Examiner—Michael Koczo
Attorney, Agent, or Firm—Matthew K. Ryan

[57] ABSTRACT

The rotor engine of the present invention includes air compressing components and engine components provided with a combustion chamber. One of the air-compressing components is rotor air-compressing and the other is piston air compressing. Air intake grooves are cut into the air-compressing rotor, and expansion grooves are cut into the engine rotor. Abutments are radially located at the position of the air-compressing rotor and the engine rotor, which divide the air intake groove and expansion groove into volume varying chambers. A gas shield disk is fitted between the air-compressing rotor and engine rotor, and end seals are fitted at the two ends of these two rotors. As a result of this construction, air-intaking, compressing and work-doing, exhausting are completed in the air-compressing components and work components respectively.

3 Claims, 6 Drawing Sheets

ROTOR ENGINE

FIELD OF THE INVENTION

The invention relates to a kind of power generating machine, in particular to a kind of rotor engine. This invention is applicable to automobile, aircraft, marine and farm machine manufacturing and to other fields in which power generating machines are needed.

BACKGROUND OF THE INVENTION

As the prior art reciprocating internal combustion engines change the reciprocation into circular motion, they have the disadvantages of unstable torque moment, great internal force, bulky, great power conversion loss and difficult manufacture.

To solve these problems, the Wankel engines and those recommended in the Chinese patents 87104050A, 87103815, 88102309.4 and 88207749.6 have made some attempts, but they have not achieved satisfactory results, because one or some of the following problems exist in each of those engines.

1. The compression ration is not high, so that the efficiency of the combustion engine is low and is uneconomical in use.
2. Incompatibility of the fuel in the combustion engine, especially such fuel as diesel oil of low volatility.
3. There is no such output power range as can be comparable with the reciprocating engine.
4. The structure is complicated, the processing is difficult and the abradability is not adequate.

OBJECT OF THE INVENTION

The object of this invention is to provide a type of rotor engine wherein the compression ratio and output power range are as large as in a reciprocating engine, and which is suitable to gasoline, coal gas, diesel oil and other types of other fuel.

SUMMARY OF THE INVENTION

The object of this invention is achieved in the following manner. The rotor engine is composed of air-compressing components and engine components. There are air intake grooves or air intake cylinders in the air-compressing components and expansion grooves and combustion chamber in the components. Air or air mixture is compressed into the combustion chamber in the engine components by the air-compressing components, to thereby burn, expand and drive the rotor to cause combustion in the combustion chamber. Its compression ratio is the ratio of the volume of the air-intake grooves to the volume of the combustion chamber. Gasoline, diesel oil, coal gas and many other kinds of fuel can be used according to different requirements.

As air-intaking, compressing, expansion and exhausting are fulfilled by two separate sets of components, it has not only such advantages as high compression ratio, being suitable to many kinds of fuel and a broader range of power output than reciprocating engines, but also such advantages as simple structure, small volume and high power/liter rate of the rotor engine, the thermal efficiency being high, and economical.

BRIEF DESCRIPTION OF THE DRAWINGS

The following is a detailed explanation of a preferred embodiment of the rotor engine of the present invention with reference to the accompanying drawings in which.

DETAILED DESCRIPTION OF THE PREFERRED EMBODIMENTS

Figure 1:
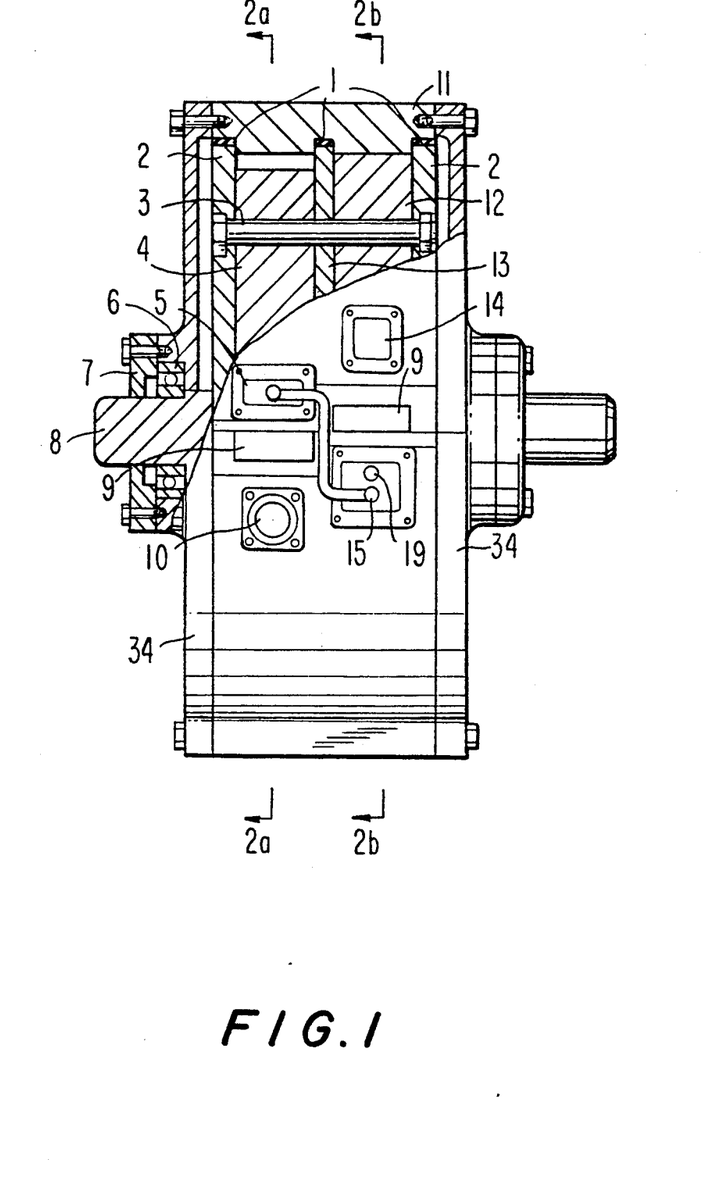
FIG. 1 is a partly sectional side view of a preferred embodiment of the rotor engine in accordance with the present invention.
Figure 2A:
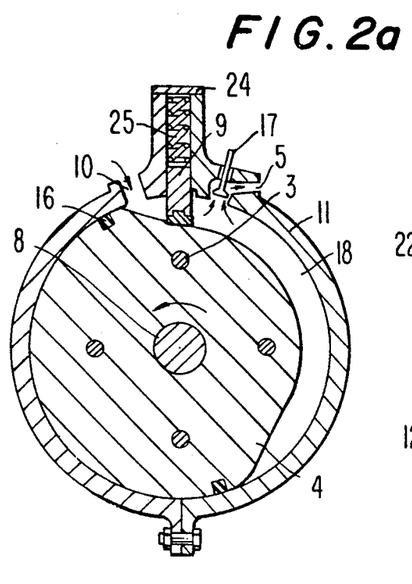
FIGS. 2(a) to 2(d) are a schematic diagram of the operating cycle of the rotor air-compressing type of the rotor engine of FIG. 1.
Figure 2B:
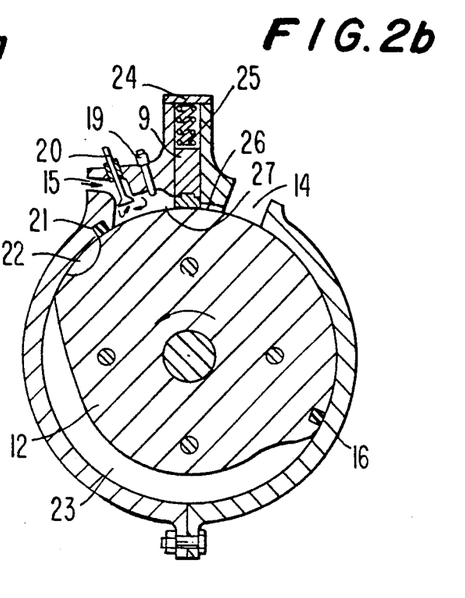
Figure 2C:
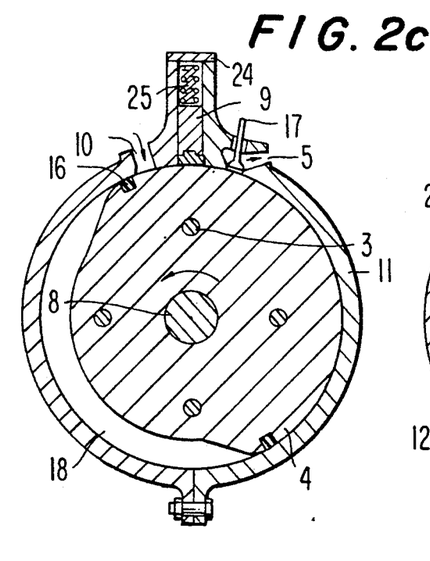
Figure 2D:
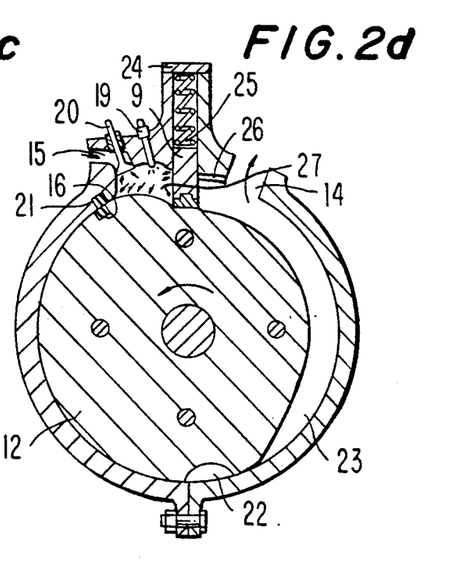
Figure 3A:
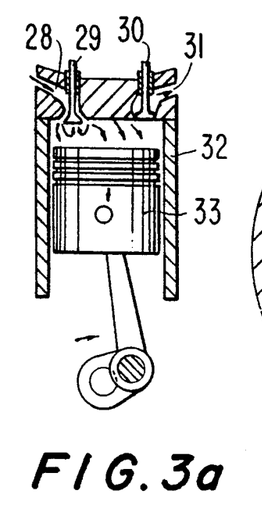
FIGS. 3(a) to 3(d) are a schematic diagram of the operating cycle of the piston air-compressing type of the rotor engine of FIG. 1.
Figure 3B:
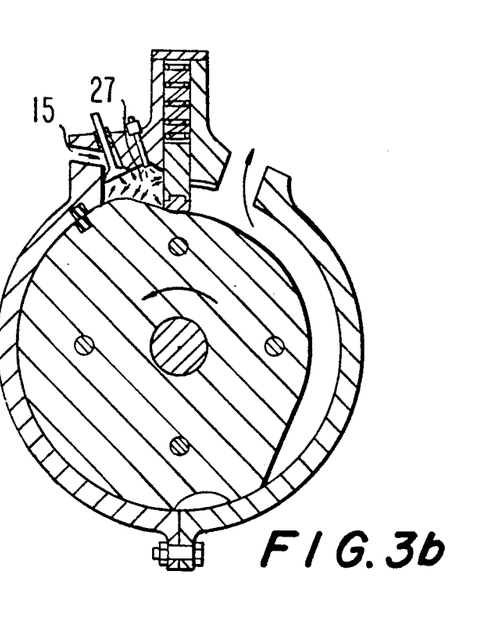
Figure 3C:
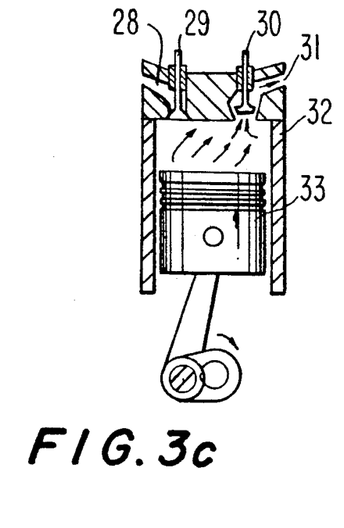
Figure 3D:
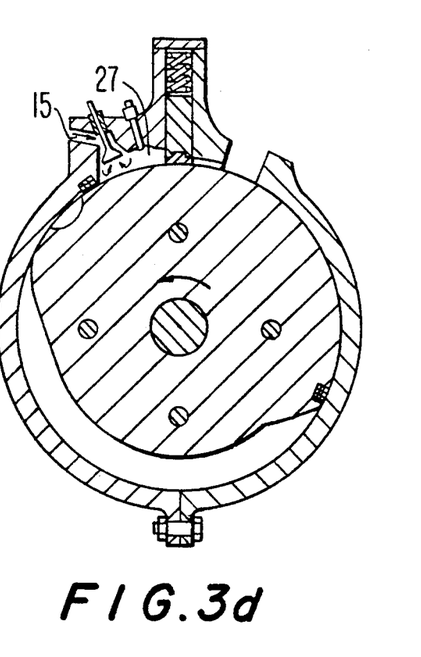
Figure 6:
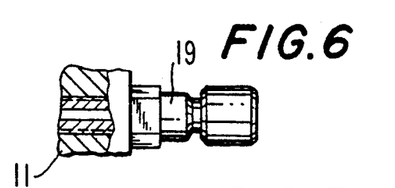
FIG. 6 is a side cross-sectional view illustrating a spark plug being used as the ignitor for the rotor engine of FIG. 1.
Figure 7:
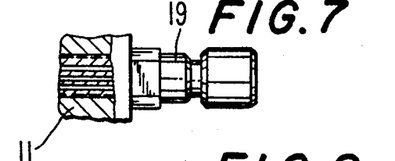
FIG. 7 is a side cross-sectional view illustrating an injection spark plug being used as the ignitor for the rotor engine of FIG. 1.

The rotor engine of the present invention is generally illustrated in FIGS. 1 and 2 hereof. The rotor engine of the present invention includes an air compressing rotor (4) and engine rotor (12) which are fitted on the principal shaft (8), with the gas shield disk (13) located between them, and end plates (2) located at the ends thereof. Choke sealing rings (1) are fixed on the outer circumference of the gas shield disk (13) and end plates (2). The end plates (2), air-compressing rotor (4), gas shield disk (13) and engine rotor (12) are tightly connected by screw bolts (3), and are mounted in the chassis (11). End cover plates (34), bearing (6) and bearing caps (7) are provided at the two-ends of the chassis (11). There are air inlet (10) and compressed air outlet (5) on the chassis (11) at the radial region of the air compressing rotor (4). Exhaust valve (17) is fitted in the compressed air outlet (5). On the air-compressing rotor (4), air intake groove (18) is cut therein and rotor seals (16) are mounted thereon. Rectangular spring-biased abutment or balance piston (9) is installed between the air inlet (10) and the compressed air outlet (5). At the bottom of this abutment, a piston head (36) (FIG. 9) is fitted, on which there is a boss (35) which is mounted in the direction of the compressed air outlet (5). Pressure springs (25) are mounted on the top of the piston and at the head of the piston, a head cover (24) is provided. Combustion chamber (27), choke slides (21), exhaust port (14), auxiliary exhaust slots (26) are provided on the chassis (11) at the radial position of the engine rotor (12). Additionally, the rectangular abutment (9) is installed between the combustion chamber (27) and the exhaust port (14). At the bottom of this abutment, a piston head (36) (See FIG. 9) is provided on which a boss (35) is formed. This boss (35) is mounted in the direction of the combustion chamber (27), and pressure springs (25) are located on the top of this piston and a head cover (24) is provided at the head of this piston. As is shown in FIGS. 2-5 and 9(a), due to pressure springs (25) exerting a biasing force on piston (9), this boss (35) is always in abutting engagement with the rotor (12) during rotation thereof even when expansion groove (23) and auxiliary exhaust groove (22) cut in the rotor (12) pass the abutment (9). As a result thereof, air intake is accomplished through air intake (10) and release and exhaust occur through air outlet (5) and exhaust port (14). Compressed air inlet (15), spark plug or injection spark plug or injection nozzle (19) (See FIGS. 6-8) are provided at the head of the combustion chamber (27). Air intake valve (20) is installed in the compressed air inlet (15) and the compressed air inlet (15) communicates with the compressed air outlet (5). Furthermore, rotor seals (16) are mounted on the engine rotor (12).

Besides the above rotor air-compressing mode, the air-compressing components of this device can work in the piston air-compressing mode. In this working mode, circular cylindrical air-compressing piston (33) is installed and can reciprocate up and down in the cylinder (32). Air inlet (28) and a compressed air outlet (31) are fitted at the head of the cylinder. An air intake (29) is installed in the air inlet (28), and an exhaust valve (30) is installed in the compressed air outlet (31). The compressed air outlet (31) communicates with the compressed air inlet (15). The crankshaft (38) of the air-compressing components of the cylinder and the engine rotor (12) rotate at the same speed.

According to Otto cycle, air-intaking, compressing, expanding and exhausting of the present invention are accomplished in the following mode.

1. Rotor air-compressing mode (FIG. 2):

0°~180° being the air-intaking, compressing stroke, performed by the air-compressing components of FIG. 2. The air-compressing rotor (4) rotates in the direction of the arrow, beginning from point (B) revolving through the balance piston (9), ending at point (A) passing the balance piston (9). Air or air mixture feeds in from the air inlet (10). At the same time, the air or air mixture which was drawn in during the last cycle is forced into the combustion chamber (27) through the compressed air outlet (5) and compressed air inlet (15).

180°~360° being the work-doing, exhausting stroke, performed by the engine components. The engine rotor rotates in the direction of arrow, beginning revolving from point (C) passing through balance piston (9). When point (C) revolves passing balance piston (9), the ignitor (19) operates, and the compressed gas mixture in the combustion chamber burns and expands, driving the rotor. At the same time, the exhaust gas which was produced during the last cycle is driven out from the exhaust port (14).

2. Piston air-compressing mode (FIG. 3):

0°~180°: Air intaking, exhausting: The piston (33) moves downwards from the head of the cylinder. Air or air mixture feeds in from the air inlet (28). The engine rotor (12) rotates in the direction of arrow. Point (C) revolves through balance piston (9) and the ignitor (19) operates. The compressed gas mixture which was forced into the combustion chamber (27) during the last cycle burns and expands, driving the rotor to accomplish work until point (D) revolves through balance piston (9) and expels the exhaust gas produced during the last cycle from the exhaust port (14).

180°~360°: Compressing: the piston 33 moves up from its bottom dead center position, thereby forcing the air or air mixture in the cylinder into the combustion chamber (27) through the compressed air outlet (31) and the compressed air inlet (15) until the piston (33) arrives at the head of the cylinder.

In this working mode, the crankshaft (38) of the piston air-compressing components rotates at the same speed as the engine rotor (12).

Figure 11A:
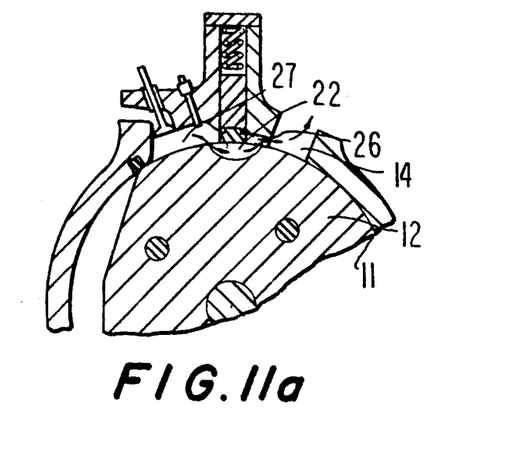
FIGS. 11(a) to 11(c) are a schematic diagram of the exhaust of the waste gas left over in the-combustion chamber.
Figure 11B:
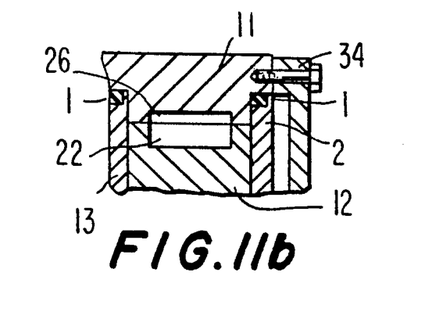
Figure 11C:
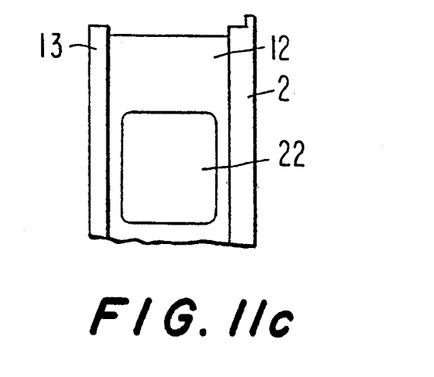
Figure 12A:
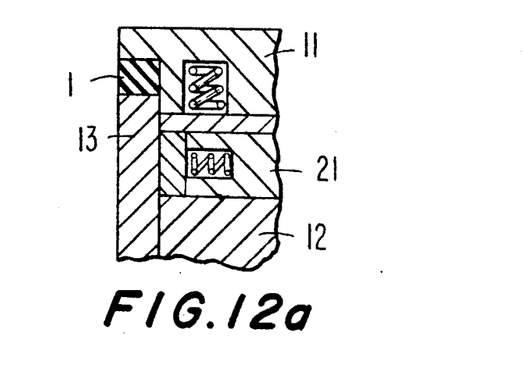
FIGS. 12(a) to 12(c) are a schematic diagram of the sealing of the rotor seal on the chassis at the engine rotor's position.
Figure 12B:
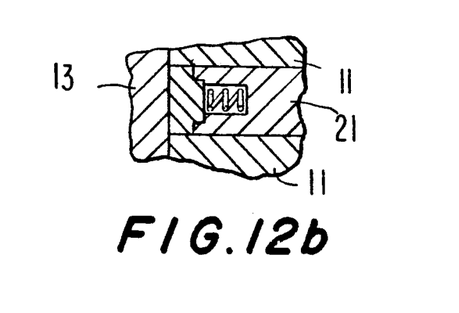
Figure 12C:
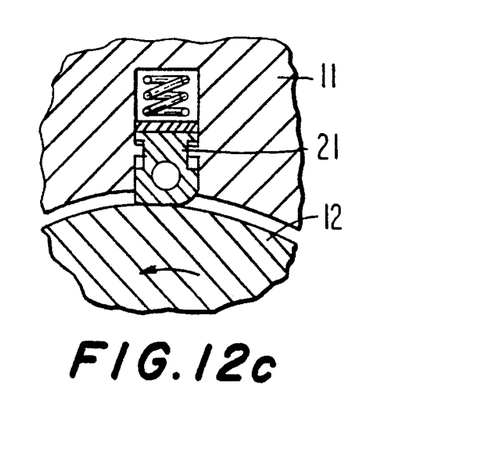

The operative process of the engine rotor is as follows. When the air or air mixture in the air-compressing components is forced out completely, the air intake valve (20) is closed. Point (C) on the engine rotor (12) revolves passing the balance piston (9) thereby igniting the spark plug or injection spark plug (19). The compressed gas mixture in the combustion chamber burns immediately and the combustion-gas expands in the space defined by balance piston (9), gas shield disk (13), end plates (2), combustion chamber (27), rotor seals (16), and expansion grooves (23), causing the rotor to perform its intended function. With the rotation of the rotor, the space is enlarged gradually until point (D) on the engine rotor (12) revolves passing the balance piston (9) and the work is completely performed. At the same time, the exhaust gas produced during the last cycle is expelled from the exhaust port (14). The exhaust gas left over in the combustion chamber (27) is driven out from the exhaust port (14) through auxiliary exhaust groove (22) and auxiliary exhaust slot (26).

In addition to the introduction of a compression ratio concept herein, an expansion ratio is also used in this rotor engine. The proportional relation of these ratios is set forth below.

| Compression ratio: | $\epsilon 1 = V28/V27$ |
| --- | --- |
| Expansion ratio: | $\epsilon 2 = V23/V27$ |
| | $\epsilon 2 > \epsilon 1$    $\epsilon 2 > \epsilon 1$ |

Wherein v28 is the volume of the air intake groove of the air-compressing rotor or the volume of the air-compressing cylinder, v23 is the volume of the expansion groove of the engine rotor, and v27 is the volume of the combustion chamber. In practical use, $\epsilon 2 < \epsilon 1$ is generally adopted. This preferred ratio causes the pressure in the expansion groove to be approximately atmospheric pressure to thereby increase the engine efficiency when the expansion is completed.

Figure 8:
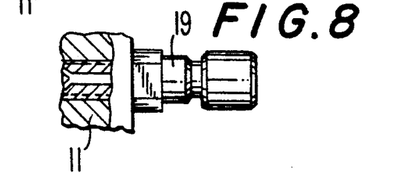
FIG. 8 is a side cross section view illustrating an injection nozzle being used as the ignitor for the rotor engine of FIG. 1.
Figures 9A, 9B:
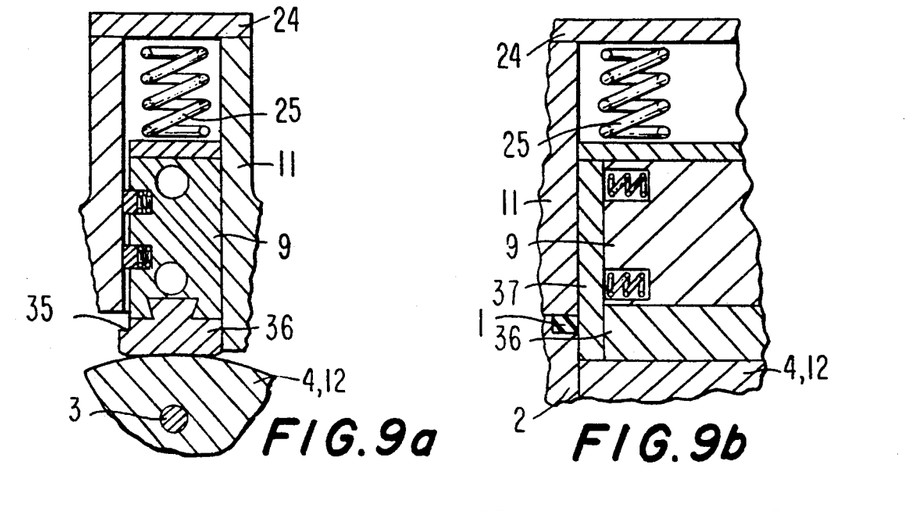
FIGS. 9(a) to 9(c) are a schematic diagram of the sealing of the abutment or rectangular balance piston of the air-compressing components and the engine components of the rotor engine of FIG. 1.
Figure 9C:
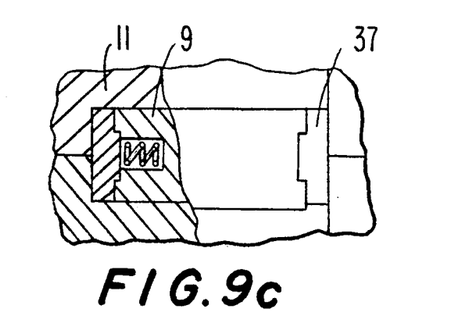
Figure 10A:
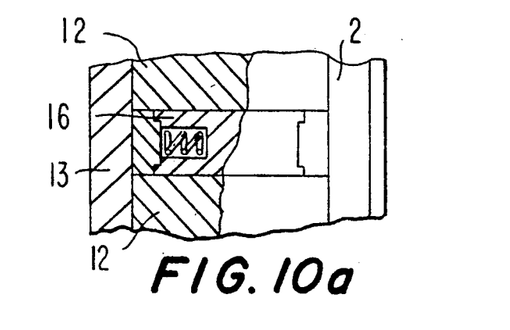
FIGS. 10(a) to 10(c) are a schematic diagram of the sealing of the rotor seal on the engine and air-compressing rotors.
Figure 10B:
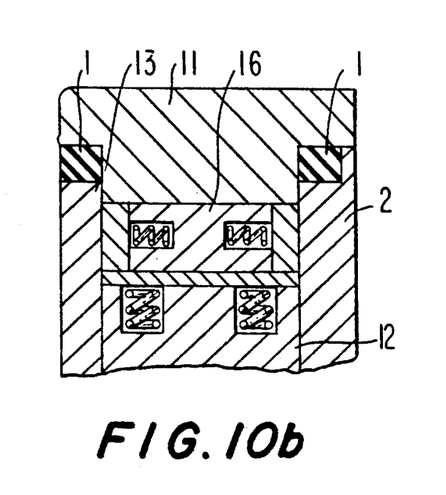
Figure 10C:
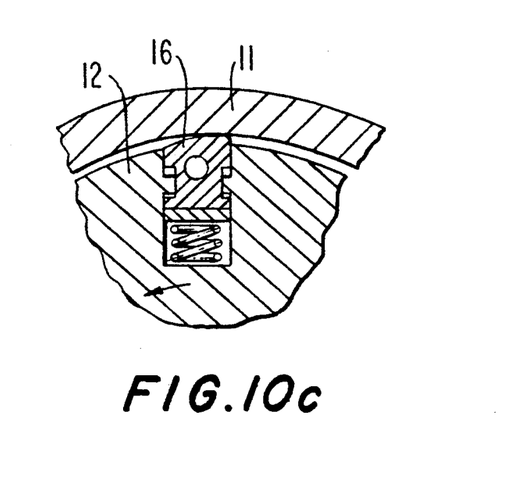

In order to adapt the engines rotor of the present invention to many kinds of fuel and different requirements, the rotor engine has three kinds of ignitors (19), namely, a spark plug (FIG. 6), an injection spark plug (FIG. 7) and an injection nozzle (FIG. 8). Moreover, there are two types of ignition modes as is set forth below:

1. Ignition mode

The compressed gas mixture in the combustion chamber (27) is ignited to burn as a result of the spark plug or the injection spark plug (19) after the compression stroke.

2. Compression ignition mode

After the compression stroke, the high pressure fuel oil is sprayed from the injection nozzle (19) and injected into the combustion chamber (27), wherein the high pressure fuel oil is mixed with the high temperature compressed air and ignited by the high temperature compressed gas.

In order to increase the sealing ability between the balance piston (9) and the axle surface of the rotor, piston heads (36) are fitted at the bottom of the balance pistons (9) of the air-compressing rotor (4) and engine rotor (12). Bosses (35) are provided on the piston heads. The bosses (35) of the air-compressing rotor's components are fitted in the direction of the compressed air outlet (5), and are fitted in the direction of the combustion chamber (27) in the engine rotor's components. Upon rotation, when the air intake groove of the air-compressing rotor or the expansion groove of the engine rotor passes through the balance piston (9), the combustion-gas or compressed gas exerts pressure on the bosses to strengthen the seal formed between the balance piston (9) and the axle surface of the rotor. Moreover, rotor seals (21), (16) are separately provided in the chassis (11) and on the rotor. Choke sealing rings (1) are fixed on the outer axle surface of the gas shield disk (13) and end plate (2) to increase the sealing during the air-compressing process and engine process.

Two kinds of cooling modes are used in the chassis of the rotor engine, one is natural or forced wind cooling, the other is water circulating cooling in which water canals are cut along the circumference of the chassis. Additionally, there are two kinds of rotor cooling methods, one is heat-sink cooling in which heat is exchanged with the chassis and the other is circulating cooling in which the engine oil or water circulates in the rotor.

The basic features of the rotor engine of the present invention comprising the air-compressing components and the engine components are introduced above. In the following description, another type of rotor air-compressing scheme will be introduced, in which two cycles of air intake and air outlet are performed per each rotation and air-compressing is accomplished four times per each rotation.

Figure 4A:
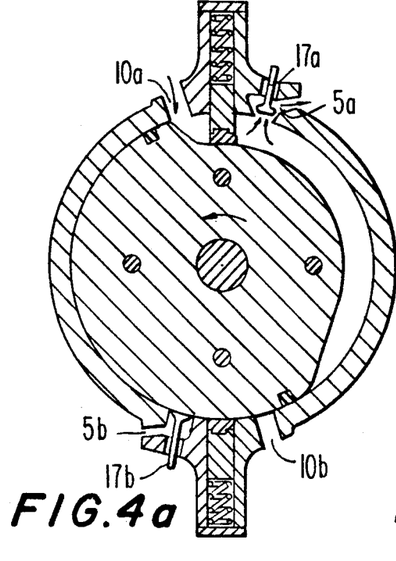
FIGS. 4(a) and 4(b) are a schematic diagram of the operating cycle of the rotor air-compressing type in which work is accomplished twice per each rotation.
Figure 4B:
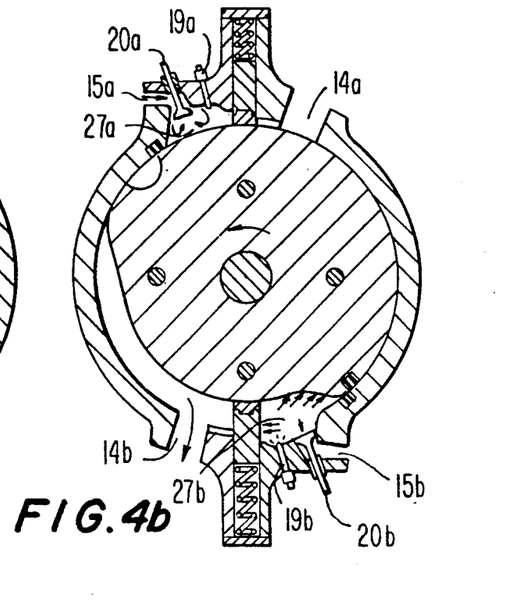

1. The scheme of performing air intake and air exhaust twice per each rotation of the rotor engine (FIG. 4).

In this working scheme, at the region radial to the air-compressing rotor (4) of the chassis, two sets of symmetrical air inlets, compressed air outlets, exhaust valves and rectangular spring-biased abutments or balance pistons are provided, and at the region radial to the engine rotor (12) of the chassis, two sets of symmetrical compressed air inlets, exhaust ports, rectangular balance pistons, auxiliary exhaust slots, combustions chambers, spark plugs or injection spark plugs or injection nozzle and air intake valves are provided. The compressed air outlet (4a) communicates with the compressed air inlet (15a) and the compressed air outlet (5b) communicates with compressed air inlet (15b). The air or air mixture breathed in from the air inlet (10a) is forced into the combustion chamber (27b) through the air intake groove (18), compressed air outlet (5b) and compressed air inlet (15b) of the air-compressing rotor, and the air or air mixture drawn in from air inlet (10b) is forced into the combustion chamber (27a) through the air intake groove (18), compressed air outlet (5a) and compressed air inlet (15a) of the air-compressing rotor. The combustion-gas burns, expands and works in the two combustion chambers at the interval of 180 angular degrees every rotation.

Figure 5:
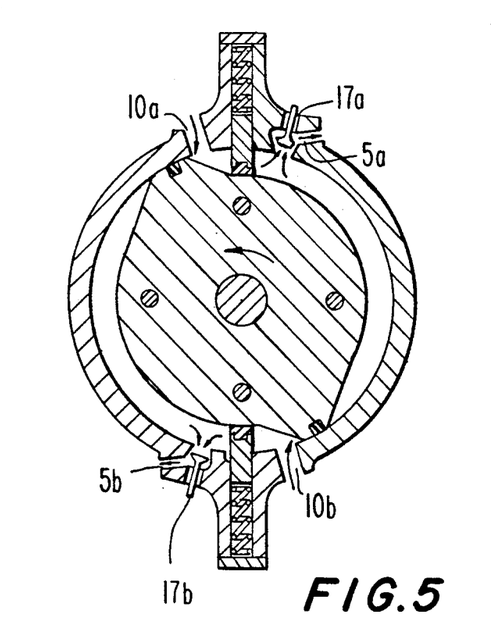
FIG. 5 is a schematic diagram illustrating air being compressed four times per each rotation of the rotor air-compressing components.

2. The scheme of compressing air for four times per each rotation of the air-compressing rotor (FIG. 5):

In this working scheme, two sets of symmetrical air inlets, compressed air outlets, exhaust valves and rectangular balance pistons on the chassis (11) at a region radial to the air-compressing rotor (4) are provided. Two air intake grooves are symmetrically opened on the air-compressing rotor. For each rotation, each air inlet, compressed air outlet, exhaust valve and air intake groove accomplish work twice respectively.

The air-compressing rotor's components of this scheme cooperate with the engine components of the previously described scheme, such that one set of the air compressing rotor's component can pressure air for two sets of the engine components, and work can be accomplished four times for each rotation. This make up the maximum power output combination of the rotor engine's single air-compressing component (single cylinder).

An embodiment of a Diesel rotor engine in accordance with the present invention will now be described. Like the above embodiment, the structure diagram and work mechanism remain unchanged. The Diesel rotor engine embodiment differs with the rotor engine applying Otto cycle in that an injection nozzle, which is illustrated in FIG. 8 and operates in the ignition mode 2, is used as the ignitor, and when the Diesel cycle is used in the engine, the compression ratio is comparatively high.

In the above schemes, if greater output power is needed, a combination of several sets of air compressing components and several sets of engine components, i.e. multiple cylinders working mode, can be employed.

Because the air-compression and engine components are used in the rotor engine and air-intaking, compressing, and work-doing, exhausting are to be performed by these two sets of components, the rotor engine has not only such advantages as high compression ratio, being suitable to many kinds of fuel, and a broader range of power output of the reciprocating engines, but also has such advantages as simple structure, small volume and high power/liter rate for a rotor engine. Moreover, the introduction of the expansion ratio concept further improves the thermal efficiency and economical property of this rotor engine. Advantageously, this rotor engine can be widely used in automobile, aircraft, marine and farm machine applications and in other applications in which power generating machines are needed.

While the present invention has been particularly shown and described with reference to certain preferred embodiments, it will be readily apparent to those of ordinary skill in the art that various changes and modifications may be made without departing from the spirit and scope of the invention. It is intended that the appended claims be interpreted as including the foregoing as well as various other changes and modifications.

I claim:

1. A rotor engine having air-compressing components and engine components comprising an air-compressing rotor and an engine rotor which are fitted on a principal shaft generally parallel to one another to thereby provide an axially outer face and an axially inner face of each said rotor; a gas shield disk mounted between said air-compressing rotor and said engine rotor to thereby separate said air-compressing rotor from said engine rotor; end plates mounted at said axially outer faces of both said air-compressing and engine rotors; wherein said air-compressing rotor, said engine rotor, said gas shield disk and said end plates being tightly retained in a chassis, said chassis having an air inlet and compressed air outlet provided therein at positions radial to said air-compressing rotor and a compressed air inlet and an exhaust port provided in said chassis in a region radial to said engine rotor; said compressed air outlet of said air compressing rotor being fitted with an exhaust valve to regulate compressed gas out of said compressed air outlet and said compressed air outlet and said compressed air inlet communicating with each other to permit compressed air to flow therebetween into a combustion chamber formed adjacent to said compressed air inlet; means for igniting said compressed air in said combustion chamber; said air compressing rotor having at least one air intake groove formed along the outer periphery thereof to define a first volume varying chamber formed between said air-compressing rotor and said chassis; said engine rotor further having at least one expansion groove formed along the outer periphery thereof to define a second volume varying chamber formed between said engine rotor and said chassis and an auxiliary exhaust groove cut therein adjacent the trailing edge of the expansion groove to assist in exhausting exhaust gas from the combustion chamber and through said exhaust port; and spring-biased abutments reciprocally movable in said chassis, each having a respective end thereof in abutting engagement with said outer periphery of said air-compressing rotor and said engine rotor to thereby vary the amount of air contained within said air inlet and exiting said compressed air outlet due to said first volume varying chamber and to vary the amount of compressed air in said combustion chamber and exiting said exhaust port due to said second volume varying chamber.

2. The rotor engine as claimed in claim 1 which is operable in a mode which can cause combustion twice per each rotation, comprising two sets of symmetrical air inlets, compressed air outlets, exhaust valves and rectangular abutments are provided on said chassis at positions radial to said air-compressing rotor, and two sets of symmetrical compressed air inlets, exhaust ports, rectangular abutments, auxiliary exhaust slots, combustion chambers, engine ignition means and air intake valves are provided on said chassis at positions radial to said engine rotor; said compressed air outlet communicating with said compressed air inlet and said compressed air outlet communicating with said compressed air inlet, wherein the air or air mixture drawn in from said air inlet is forced into said combustion chamber through said air intake groove, said compressed air outlet and said compressed air inlet of said air-compressing rotor, so that the combustion-gas burns, expands and combusts in the combustion chambers at an interval of 180 angular degrees every rotation.

3. A device as claimed in claim 2, wherein said air-compressing components are capable of operating four times per each rotation, wherein two sets of symmetrical air inlets, compressed air outlets, exhaust valves and abutments are provided on said chassis at positions radial to said air-compressing rotor; two air intake grooves are cut symmetrically on said air-compressing rotor, and for each rotation, each said air inlet, said compressed air outlet, sand exhaust valve and air intake groove operate twice.

* * * * *